United States Patent [19]

Taylor

[11] Patent Number: 4,457,387

[45] Date of Patent: Jul. 3, 1984

[54] HYDRAULIC STEERING SYSTEM FOR FULL-TRACK VEHICLES

[75] Inventor: Henry D. Taylor, Pontiac, Mich.

[73] Assignee: Vickers, Incorporated, Troy, Mich.

[21] Appl. No.: 151,305

[22] Filed: May 19, 1980

[51] Int. Cl.³ .............................................. B62D 11/04
[52] U.S. Cl. .................................. 180/6.48; 60/484; 180/333
[58] Field of Search ................ 180/6.48, 333; 60/484; 74/471 XY

[56] References Cited

U.S. PATENT DOCUMENTS 3,672,161  6/1972  Krusche et al. .................... 180/6.48
4,033,128  7/1977  Aoyama et al. ...................... 60/484
4,076,090  2/1978  Krusche et al. .................... 180/6.48
4,235,297  11/1980  Porta ................................. 180/6.48

Primary Examiner—Joseph F. Peters, Jr.
Assistant Examiner—Donn McGiehan
Attorney, Agent, or Firm—Barnes, Kisselle, Raisch, Choate, Whittemore & Hulbert

[57] ABSTRACT

A hydraulic system for controlling hydraulic motors for driving a tracked vehicle which circuit utilizes a single manual control lever to control valve control units to direct pilot pressure to actuate bi-directional valves that control the direction of movement of the hydraulic motors.

9 Claims, 5 Drawing Figures

HYDRAULIC STEERING SYSTEM FOR FULL-TRACK VEHICLES

This invention relates to hydraulic circuits particularly intended for use for steering control for full-tracked vehicles.

BACKGROUND AND SUMMARY OF THE INVENTION

Steering of full-track vehicles is controlled by varying the speed or stopping the motors of drive to each track usually by separate manual controls.

For example, foot operated pedals, one to control the left track and the other to control the right track have been used. Such an arrangement requires a careful coordination of pedal displacements to maintain a straight course of constant turning rate. The use of both pedals is required for straight ahead, reverse and spin-turn operations.

Accordingly, the present invention is directed to obviating the problems with such an arrangement.

In accordance with the present invention, the hydraulic steering control circuit utilizes pilot pressures, produced by a manual displacement of a remote hydraulic controller, to produce proportional displacements of conventional directional valves, and therefore proportional control of hydraulic motors and, in turn, track speeds.

In the preferred form, the present invention utilizes a remote hydraulic controller of a type commercially available from several manufacturers world-wide which includes a manually operated lever known as a "joystick". Manual displacement of the "joystick" lever produces an output pressure proportional to lever displacement angle from the vertical at any one of four pilot pressure output ports, with the pressurized port location corresponding to the direction of lever motion. If the lever is moved in a direction between two output ports; instead of directly toward one, both ports will develop pressure, and the ratio of the two pressures will be a function of the directional angle.

The hydraulic circuit senses the higher of the two signals and this higher signal is utilized to actuate the hydraulic motor which drives the appropriate track.

The hydraulic steering system embodying the invention is designed to meet the following requirements:

1. A single control for one-handed operation.
2. Capability of driving forward or reverse, straight, or in steering turns.
3. Pivoting turns with one track locked, and the other driving, either forward or in reverse.
4. Pivoting with one track driving forward, and the other in reverse.
5. Direction of vehicle motion to correspond with direction of controller lever motion.
6. Track speed proportional to controller lever displacement.

DESCRIPTION OF THE DRAWINGS

Referring to FIG. 1, in the preferred embodiment, the hydraulic system embodying the invention comprises a first reversible hydraulic motor 10 for driving the right track of a vehicle and a second reversible hydraulic motor 11 for driving the left track of a vehicle. Each hydraulic motor 10, 11 is controlled by first and second pilot operated bi-directional valves 12, 13 which control flow from a pump 14 through lines 15, 16, respectively.

Figure 1:
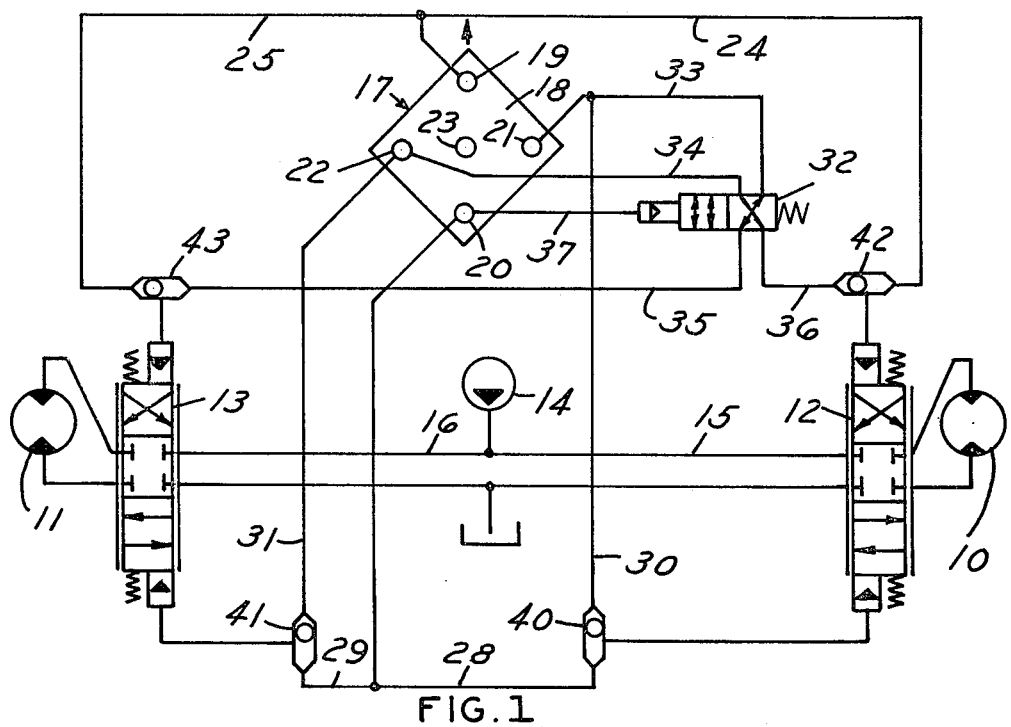
FIG. 1 is a schematic diagram of a hydraulic system embodying the invention.

The actuation of the bi-directional valves 12, 13 is controlled by a single lever controller 17 comprising a body 18 and manually operated valve control units 19, 20, 21, 22. A manual lever 23 is mounted on body 18 for operating valve control units 19, 20, 21, 22. Each of the valve control units is operable to produce an output proportional to manual displacement thereof.

Figure 5:
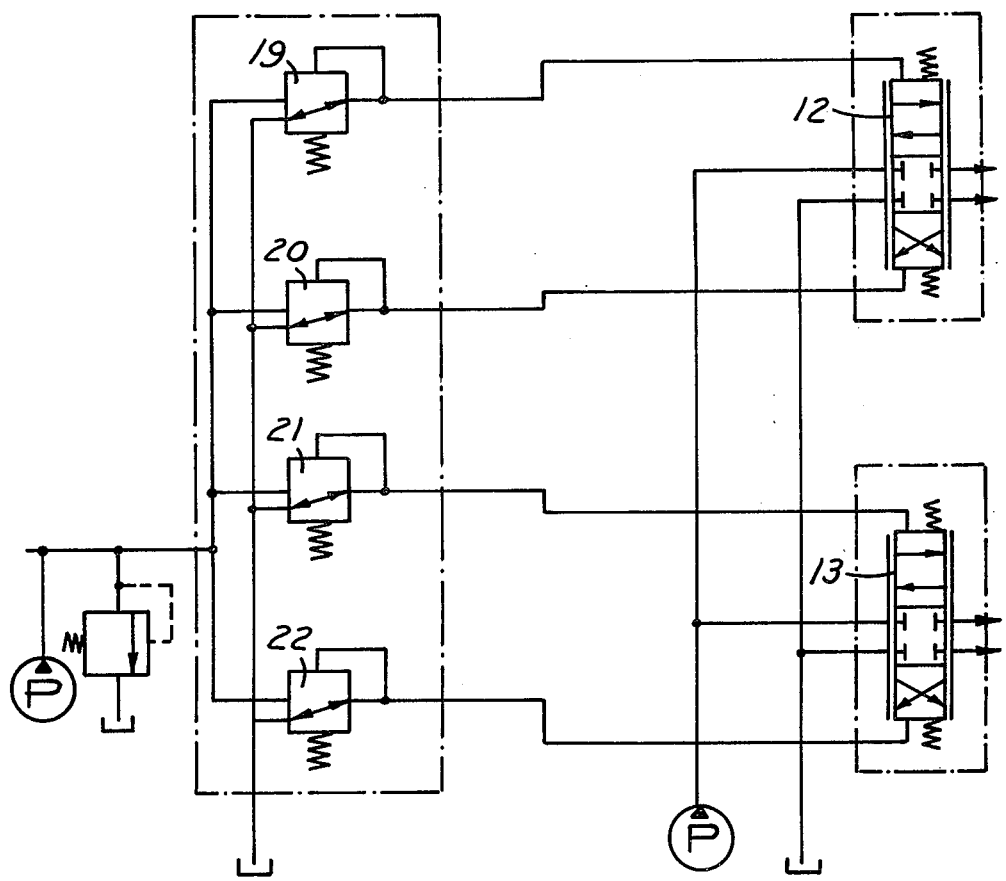
FIG. 5 is a schematic diagram of the hydraulic circuit of a conventional manual controller.

A typical schematic of a single lever controller is shown in FIG. 5 wherein control valve units 19, 20 21, 22 are supplied with pressure from a pilot pressure pump and function to actuate directional valves 12, 13.

Controller 17 is of conventional construction and is commonly known as a "joystick" controller.

In such a controller, first, second, third and fourth valve control units 19–22 respectively, are spring loaded to their off position wherein they hold the manual control lever in a neutral position. Movement of the manual lever toward any of the valve units displaces the valve unit. Movement of the manual lever in a direction between two valve units operates both.

In accordance with the invention, controller 17 is positioned on the vehicle in a position that lever 23 is movable forward to operate valve control unit 19; rearwardly to operate valve control unit 20; to the right to operate valve control unit 21; to the left to operate valve control unit 22; and to control units simultaneously.

Further in accordance with the invention, first valve control unit 19 is connected to the ends of first and second bi-directional valves 12, 13 through lines 24, 25 so that operation of first valve control unit 19 will apply pilot pressure to actuate both bi-directional valves 12, 13 simultaneously and operate both hydraulic motors in a first or forward direction.

Second valve control unit 20 is connected to the opposite ends of the first and second bi-directional valves 12, 13 through lines 28, 29 so that operation of second valve control unit 20 will apply pilot pressure to actuate both bi-directional valves simultaneously in the opposite direction and operate both hydraulic motors in a second or reverse direction.

Third valve control unit 21 is also connected to the other end of the first bi-directional valve 12 through line 30 so that operation of third valve control unit 21 actuates the first bi-directional valve 12 to operate the first hydraulic motor 10 in a second or reverse direction.

Fourth valve control unit 22 is connected to the other end of the second bi-directional valve 13 through line 31 so that operation of fourth valve control unit 22 actuates the second bi-directional valve 13 to operate the second hydraulic motor 11 in a second or reverse direction.

In addition, a pilot operated two position valve 32 is provided and is connected by lines 33, 34 to the third and fourth valve control units 21, 22 so that in a first position it permits flow from the third valve control unit 21 to the one end of the second bi-directional valve 13 through line 35 when the third valve control unit 21 is operated and permits flow from the fourth valve control unit 22 to the one end of the first bi-directional valve 12 through line 36 when the fourth valve control unit 22 is operated. Valve 32 is connected to the second valve control unit 20 through a pilot control line 37 so that when the second valve control unit 20 is actuated valve 32 is shifted to a second position. In this second position, the connections of the third and fourth valve control units 21, 22 to the bi-directional valves 12, 13 are reversed so that valve 32 permits flow from third valve control 21 to the one end of the first bi-directional valve 12 through line 36 and permits flow from fourth valve control unit 22 to the one end of second bi-directional valve 13 through line 35.

Where the controller or "joystick" is moved to operate two of the valve control units 19–22 simultaneously, valve means are provided to sense the greater of the two pilot pressures from the valves and apply the higher of the two pilot pressures to the bi-directional valves 12, 13. This valve means comprises a shuttle valve 40 provided at the juncture of lines 28, 30; a shuttle valve 41 provided at the juncture of lines 29, 31; a shuttle valve 42 provided at the juncture of lines 24, 36, and a shuttle valve 43 provided at the juncture of lines 25, 35.

DESCRIPTION OF OPERATION

1. Traveling straight ahead—lever motion directly forward generates pressure at the first control valve unit 19. Both directional valves 12, 13 are displaced equally, and both tracks are driven forward at equal speeds. In reverse the operation is similar, but the second control valve unit 20 is pressurized.

2. Steering—If the lever is moved in a direction slightly to the left of straight forward, the fourth control valve unit 22 will be partially pressurized. This pressure will have a negligible effect on the pressure being applied to first bi-directional valve 12 through line 34 because of the isolating effect of shuttle valve, 40 but will be applied fully to second bi-directional valve 13 in opposition to the pressure from first control valve unit 19. Displacement of the second bi-directional valve 13 will decrease, thereby decreasing the forward speed of the left track, and the vehicle will steer to the left. As the lever is moved further to the left, the pressure at the fourth control valve unit 22 will increase, resulting in a further decrease of left track speed and a sharper turn to the left. Steering to the right is similar, but third control valve unit 21 becomes pressurized instead of fourth control valve unit 22, resulting in a slowing of the right track to achieve turning.

3. Steering in Reverse—Whenever the controller lever is moved such that its motion has a rearward component, second control valve unit 20 is pressurized to some degree, and the directional valve 32 will shift. As a result, the steering action, which is similar to (2) above, affects the track in the same direction as the lever displacement. For example, if the lever is moved to the left and rear, second and fourth control valve units 20, 22 will be pressurized. The pressure from fourth control valve unit 22 through the shifted two position valve 32 will result in a reduction of the reverse speed of the left track, causing the vehicle to turn to the left as it backs up.

4. Pivoting about a point—
   a. If the controller lever is moved forward at 45° to the left, first and fourth control valve units 19, 22 will be equally pressurized. Both ends of second directional valve 13 will be acted upon by these equal pressures so that the left track will not be driven. Pressure from the fourth valve unit 22 will displace the first bi-directional valve 12 causing the right track to drive forward, pivoting the vehichle forward to the left. Motion to the right is similarly controlled, as is the pivoting motion in reverse. In reverse, the action of the directional valve 32 causes the pivoting motion to be in the direction of the handle motion.
   b. If the controller lever is moved to the left, at 90 degrees to the forward position, fourth control valve unit 22 will be pressurized, causing the left track to drive in reverse, and the right track to drive forward, at the same speed. The vehicle will pivot to the left about its central axis. If, from this position, the lever is moved progressively forward, the reverse speed of the left track will decrease until, at 45 degrees, the pivot about one track, as described in (a) above will result. Lever motion to the right will produce a similarly controlled pivot in the opposite direction. It should be noted that if a reverse motion is commanded, and the directional valve 32 is actuated, it is not possible to drive the tracks in opposite directions to get a central axis pivot.

5. Response Discontinuity—If the controller lever is held in a 90 degree position to give the center-axis turn described in 4b above, and then moved slightly to the rear, (enough to trigger the directional valve 32), vehicle motion will abruptly switch from a center-axis pivot to a complete stop. In the same manner, if the controller lever is moved from its centered position, directly to a position slightly to the rear of either 90 degree position, no track motion will result, but if the lever is then advanced slightly to the 90 degree position, directional valve 32 will shift, and a center-axis pivot will start. The only discontinuity in control response occurs at these two points. Elsewhere there will be a smooth gradual shift from one motion to another in proportion to lever rotation.

6. Special Component Requirements—The four pressure control valves 19, 20, 21, 22 which form the remote hydraulic controller 17 must provide a flow path back to tank pressure whenever they are not developing an out pressure.

7. An important characteristic of this circuit is the ability to drive one bi-directional valve end from either of two sources. The shuttle valves accomplish this in four places as shown in FIG. 1. For example, if pressure is developed at controller valve unit 22 shuttle valve 41 opens, and the pressure is applied to the lower end of the second bi-directional valve 13. If pressure is developed at second valve unit 20, instead of fourth valve unit 22, the shuttle valve 41 will prevent back flow through fourth valve unit 22. If both valve units are pressurized, the higher of the two pressures will be applied to the bi-directional valve.

Figure 2:
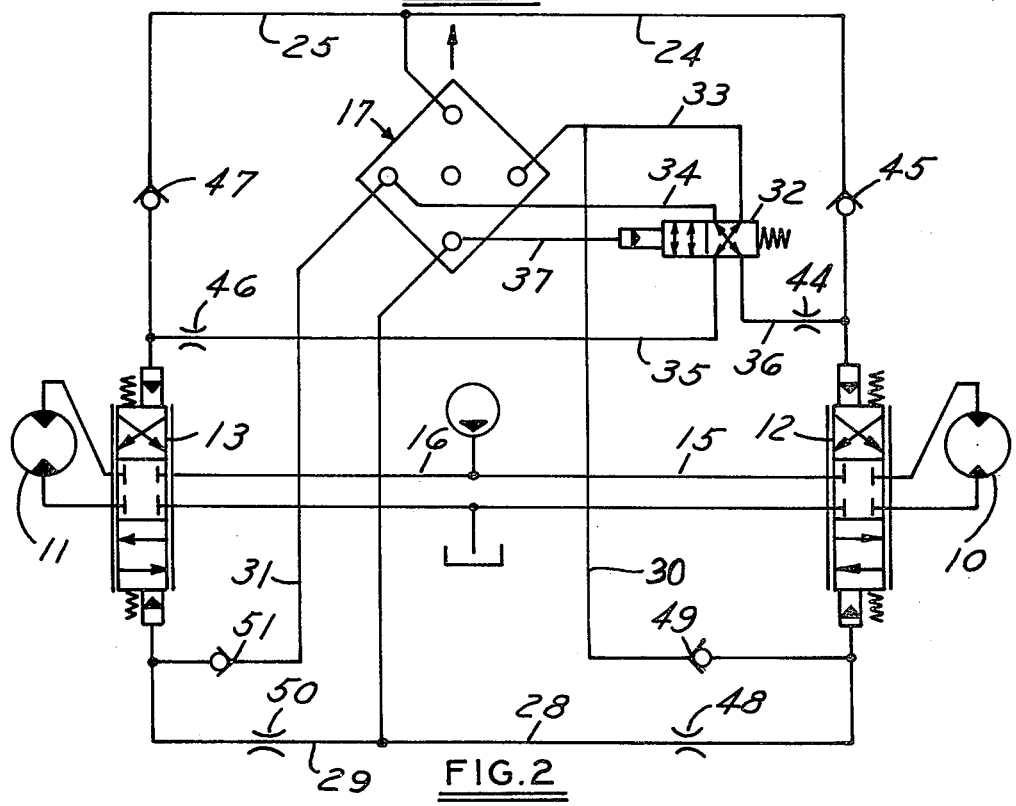
FIG. 2 is a schematic diagram of a modified form of hydraulic system.

8. Instead of shuttle valve combinations, as shown in FIG. 1, the circuit may use orifice-check valve combinations as shown in FIG. 2.

Thus an orifice 44 is provided in line 36 and a check valve 45 in line 24; and orifice 46 is provided in line 35 and a check valve 47 in line 25; an orifice 48 is provided in line 28 and a check valve 49 in line 30; and an orifice 50 is provided in line 29 and a check valve 51 in line 31.

MODIFICATIONS

As stated above, the basic characteristic of this circuit is the ability to drive one end of a directional valve from either of two sources, using orifices and check valves, or shuttle valves.

Figure 3:
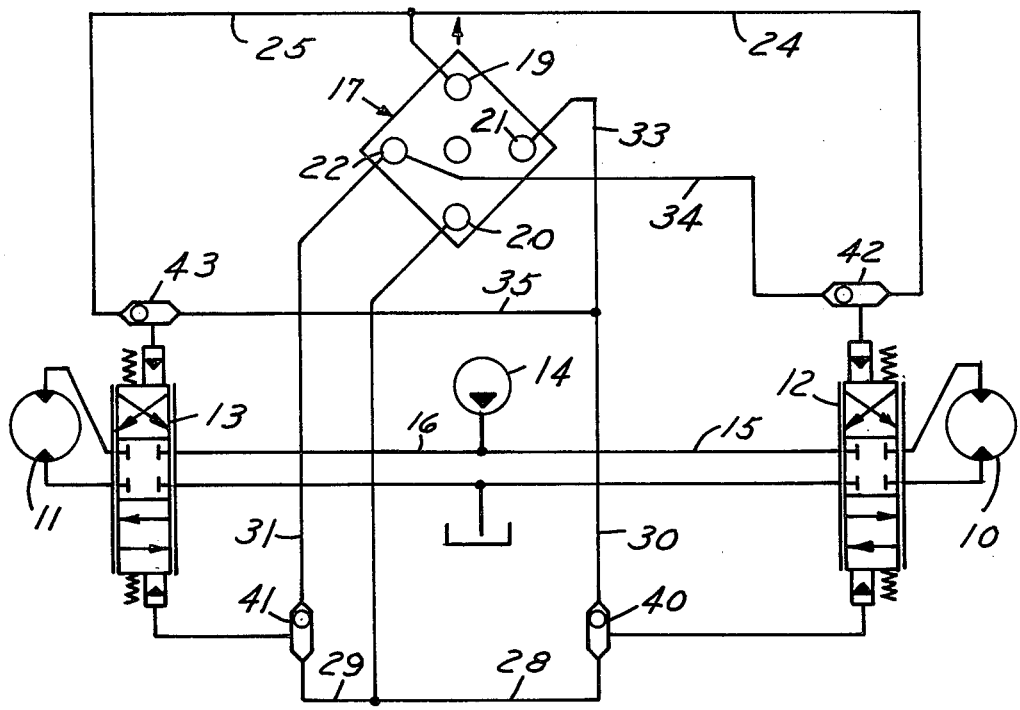
FIG. 3 is a schematic diagram of a further modified form of hydraulic circuit.

The directional valve 32 shown in FIG. 1 may be omitted (circuit permanently connected as in the spring-offset position of the valve 32). Such a circuit is shown in FIG. 3. In such a circuit, the direction of handle motion, left or right, will correspond with the direction of vehicle rotation, counterclockwise or clockwise, instead of corresponding with the direction of motion.

Figure 4:
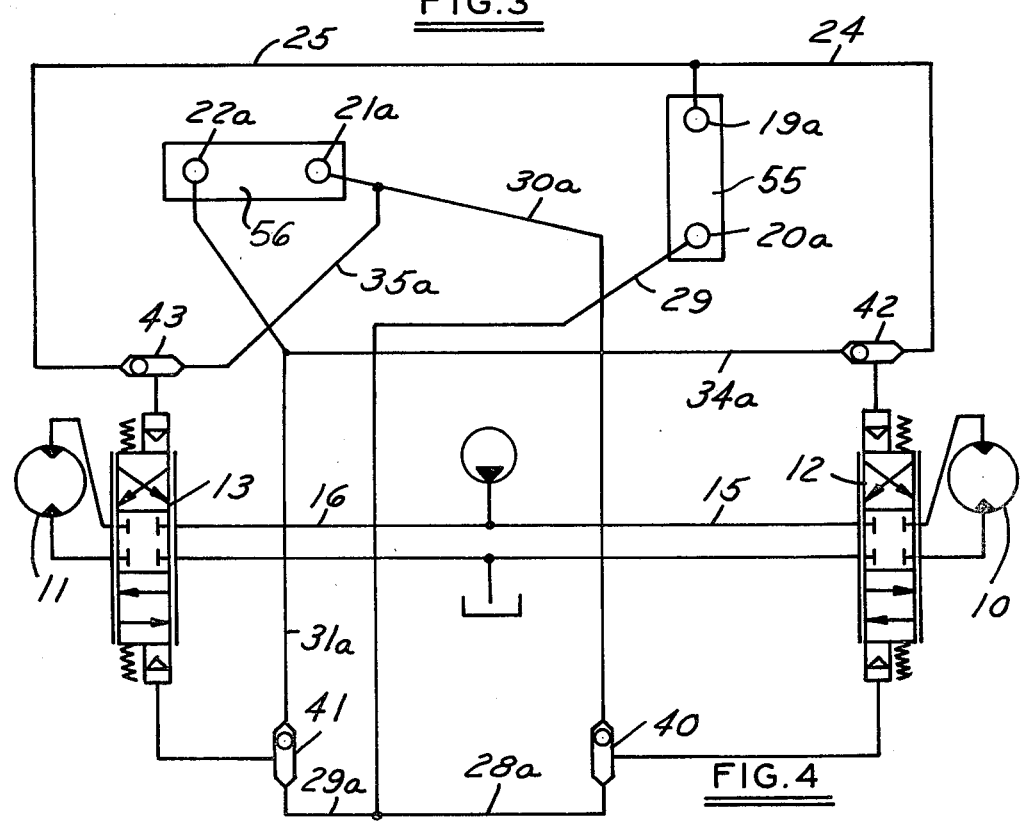
FIG. 4 is a schematic diagram of another modified form of hydraulic circuit.

In a further modification, the control signals may be generated by single-function remote hydraulic controls, instead of the double-function "joystick" type. For example, two foot (or hand) operated controls 55, 56 may be connected as shown in FIG. 4, control 55 operating first and second valve control units 19a, 20a and control 56 operating third and fourth valve control units 21a, 22a. The hydraulic circuit is otherwise like that of FIG. 3, corresponding lines having the same number with suffix "a". Control 55 commands forward or reverse motion, and control 56 commands clockwise or counterclockwise rotation. Actuating both together produces the steering turn.

The four pressure sources, shown in FIG. 1 as incorporated in a single double-function unit, or in FIG. 4 as two single-function units, may also comprise four independent valve units with the disadvantage of requiring separate manual movement of each.

Other approaches to providing "joystick" control for tracked vehicle steering would fail to meet one or more of the requirements listed above, or become unacceptably complex. For example, if the single lever control unit were positioned so that forward and rearward movement or left and right of the lever operates two valves. Such a circuit would provide all the required steering functions, but would in the wrong direction in reverse (e.g., if the control lever is moved backward and to the left, the vehicle would back up to the right.

In its preferred embodiment, the circuit embodying the invention meets all the performance requirements without making necessary an additional operator input, (such as actuating a separate directional valve) and is reasonably simple. In addition, the axis for forward-reverse command on the remote hydraulic controller is the diagonal axis through the first and second valve units 19, 20 shown on the schematic. The circuit allows the controller to be oriented so that as to take advantage of the detent or centering action of the springs in the controller, which tends to make the manual control lever move more easily in the directions along the axis between first and second valve control units 19 and 20 and the axis between first and second valve control units 21, 22.

I claim:

1. A hydraulic steering system for full-tracked vehicles comprising first and second reversible hydraulic motors adapted to drive a pair of respective vehicle tracks, a first and second bi-directional valve for said first and second hydraulic motors, respectively, first, second, third and fourth manually operable valve control units adapted to be connected to a source of pilot pressure, each said valve control unit being operable to produce an output proportional to manual displacement thereof, said first valve control unit being connected to said bi-directional valves such that operation of said first valve control unit functions to actuate said bi-directional valves to a first position to operate both said hydraulic motors in a first driving direction, said second valve control unit being connected to said first and second bi-directional valves such that operation of said second valve control unit functions to actuate said bi-directional valves to a second position to operate said hydraulic motors in a second driving direction, said third valve control unit being connected to said first bi-directional valve which controls said first hydrualic motor such that operation of said third valve control unit functions to actuate said first bi-directional valve to operate said first hydraulic motor in a second driving direction, said fourth valve control unit being connected to said second bi-directional valve which controls said second hydraulic motor such that operation of said fourth valve control unit functions to actuate said second bi-directional valve to control said second hydraulic motor in a second driving direction, said third valve control unit being also connected to permit flow when operated to said second bi-directional valve to tend to actuate said second bi-directional valve in a direction to operate the second hydraulic motor in said first driving direction, said fourth valve control unit being also connected to permit flow when operated to said first bi-directional valve to tend to actuate said first bi-directional valve in a direction to operate its first hydraulic motor in said first direction, valve means associated with each end of each bi-directional valve and operable to sense the greater of the two pilot pressures and permit the greater to be applied to the bi-directional unit when two valve control units are operated simultaneously and tend to direct two pilot pressures toward the same end of a bi-directional valve unit, a pilot operated directional valve connected to said second valve control unit and operable upon simultaneous displacement of said second valve control unit and said third control unit to actuate said first bi-directional valve so that said first hydraulic motor is not operated, said directional valve being also connected to said fourth valve control unit such that upon simultaneous displacement of said second valve control unit and said fourth control unit, said second hydraulic motor is not operated.

2. The hydraulic system set forth in claim 1 including orifice means between said directional valve and each said first and second bi-directional valves, and orifice means between said second valve control unit and said other end of said first and second bi-directional valves.

3. The hydraulic system set forth in claim 2 wherein said four manually operable control units form a part of a single controller, having a single lever movable such that the first valve control unit is operated by movement of said lever in a forward direction, said second valve control unit is operated by movement of said lever in a rearward direction, said third valve control unit is operated by movement of said lever toward the right, said fourth valve control element is operated by movement of said lever to the left and movement of said lever to intermediate positions operates the adjacent pairs of valve control units.

4. The hydraulic system set forth in claim 1 including a first lever for operating said first and second valve control units and a second lever for operating said third and fourth control units.

5. The hydraulic system set forth in claim 2 including a first lever for operating said first and second valve control units and a second lever for operating said third and fourth control units.

6. A hydraulic steering system for full-tracked vehicles comprising
   first and second reversible hydraulic motors adapted to drive a pair of respective vehicle tracks,
   a pump for supplying hydraulic fluid to said motors,
   a first and a second pilot operated bi-directional flow control valve for controlling the flow of fluid from said pump to said first and second hydraulic motors, respectively,
   first, second, third and fourth manually operable valve control units adapted to be connected to a source of pilot pressure, each said valve control unit being operable to produce an output proportional to manual displacement thereof,
   said first valve control unit being connected to said bi-directional valves such that operation of said first valve control unit functions to actuate said bi-directional valves to a first position to operate both said hydraulic motors in a first driving direction,
   said second valve control unit being connected to said first and second bi-directional valves such that operation of said second valve control unit functions to actuate said bi-directional valves to a second position to operate said hydraulic motors in a second driving direction,
   said third valve control unit being connected to said first bi-directional valve which controls said first hydraulic motor such that operation of said third valve control unit functions to actuate said first bi-directional valve to operate said first hydraulic motor in a second driving direction,
   said fourth valve control unit being connected to said second bi-directional valve which controls said second hydraulic motor such that operation of said fourth valve control unit functions to actuate said second bi-directional valve to control said second hydraulic motor in a second driving direction,
   said third valve control unit being also connected to permit flow when operated to said second bi-directional valve to tend to actuate said second bi-directional valve in a direction to operate the second hydraulic motor in said first driving direction,
   said fourth valve control unit being also connected to permit flow when operated to said first bi-directional valve to tend to actuate said first bi-directional valve in a direction to operate its first hydraulic motor in said first direction,
   valve means associated with each end of each bi-directional valve and operable to sense the greater of the two pilot pressures and permit the greater to be applied to the bi-directional unit when two valve control units are operated simultaneously and tend to direct two pilot pressures toward the same end of a bi-directional valve unit,
   said valve means comprising a pilot operated directional valve connected to said second valve control unit and operable upon simultaneous displacement of said second valve control unit and said third control unit to actuate said first bi-directional valve so that said first hydraulic motor is not operated,
   said directional valve being also connected to said fourth valve control unit such that upon simultaneous displacement of said second valve control unit and said fourth control unit, said second hydraulic motor is not operated.

7. The hydraulic system set forth in claim 6 including orifice means between said directional valve and each said first and second bi-directional valves, and orifice means between said second valve control unit and said other end of said first and second bi-directional valves.

8. The hydraulic system set forth in claim 7 wherein said four manually operable control units form a part of a single controller, having a single lever movable such that the first valve control unit is operated by movement of said lever in a forward direction, said second valve control unit is operated by movement of said lever in a rearward direction, said third valve control unit is operated by movement of said lever toward the right, said fourth valve control element is operated by movement of said lever to the left and movement of said lever to intermediate positions operates the adjacent pairs of valve control units.

9. The hydraulic system set forth in claim 7 including a first lever for operating said first and second valve control units and a second lever for operating said third and fourth control units.

* * * * *